(12) United States Patent
Spohrer et al.

(10) Patent No.: US 7,881,471 B2
(45) Date of Patent: Feb. 1, 2011

(54) SYSTEMS AND METHODS FOR RECORDING AN ENCRYPTED INTERACTION

(75) Inventors: Daniel Thomas Spohrer, Alpharetta, GA (US); Jamie Richard Williams, Alpharetta, GA (US); Marc Adam Calahan, Woodstock, GA (US)

(73) Assignee: Verint Systems Inc., Melville, NY (US)

( * ) Notice: Subject to any disclaimer, the term of this patent is extended or adjusted under 35 U.S.C. 154(b) by 1250 days.

(21) Appl. No.: 11/428,222

(22) Filed: Jun. 30, 2006

(65) Prior Publication Data

US 2008/0065902 A1 Mar. 13, 2008

(51) Int. Cl.
*H04K 1/00* (2006.01)
*H04M 1/64* (2006.01)
*H04M 15/00* (2006.01)

(52) U.S. Cl. .................... 380/257; 379/85; 379/112.01; 379/133

(58) Field of Classification Search ................. 379/265; 380/257
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,684,349 A | 8/1987 | Ferguson et al. | |
| 5,101,402 A | 3/1992 | Chiu et al. | |
| 5,267,865 A | 12/1993 | Lee et al. | |
| 5,311,422 A | 5/1994 | Loftin et al. | |
| 5,434,920 A * | 7/1995 | Cox et al. .................... | 380/257 |
| 5,594,798 A * | 1/1997 | Cox et al. .................... | 380/257 |
| 5,597,312 A | 1/1997 | Bloom et al. | |
| 5,696,880 A * | 12/1997 | Gustafson et al. ........... | 704/273 |
| 5,717,879 A | 2/1998 | Moran et al. | |
| 5,790,798 A | 8/1998 | Beckett, II et al. | |
| 5,809,250 A | 9/1998 | Kisor | |
| 5,825,869 A | 10/1998 | Brooks et al. | |
| 5,958,016 A | 9/1999 | Chang et al. | |
| 5,964,836 A | 10/1999 | Rowe et al. | |
| 5,978,648 A | 11/1999 | George et al. | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,057,841 A | 5/2000 | Thurlow et al. | |
| 6,061,798 A | 5/2000 | Coley et al. | |
| 6,076,099 A | 6/2000 | Chen et al. | |
| 6,078,894 A | 6/2000 | Clawson et al. | |
| 6,108,711 A | 8/2000 | Beck et al. | |
| 6,122,665 A | 9/2000 | Bar et al. | |
| 6,122,668 A | 9/2000 | Teng et al. | |

(Continued)

OTHER PUBLICATIONS

Notification of Transmittal of the International Search Report and the Written Opinion of the International Searching Authority, dated Jun. 20, 2008.

(Continued)

*Primary Examiner*—Christian LaForgia
(74) *Attorney, Agent, or Firm*—Lawrence A. Aaronson, PC

(57) ABSTRACT

Systems and methods for recording an encrypted contact center interaction.

43 Claims, 9 Drawing Sheets

U.S. PATENT DOCUMENTS

| | | | |
|---|---|---|---|
| 6,138,139 A | 10/2000 | Beck et al. | |
| 6,144,991 A | 11/2000 | England | |
| 6,146,148 A | 11/2000 | Stuppy | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Purnam et al. | |
| 6,301,462 B1 | 10/2001 | Freeman et al. | |
| 6,301,573 B1 | 10/2001 | McIlwaine et al. | |
| 6,324,282 B1 | 11/2001 | McIllwaine et al. | |
| 6,347,374 B1 | 2/2002 | Drake et al. | |
| 6,351,467 B1 | 2/2002 | Dillon | |
| 6,370,574 B1 | 4/2002 | House et al. | |
| 6,404,857 B1 | 6/2002 | Blair et al. | |
| 6,418,471 B1 | 7/2002 | Shelton et al. | |
| 6,459,787 B2 | 10/2002 | McIllwaine et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,529,602 B1* | 3/2003 | Walker et al. | 380/283 |
| 6,535,909 B1 | 3/2003 | Rust | |
| 6,542,602 B1 | 4/2003 | Elazar | |
| 6,546,405 B2 | 4/2003 | Gupta et al. | |
| 6,583,806 B2 | 6/2003 | Ludwig et al. | |
| 6,606,657 B1 | 8/2003 | Zilberstein et al. | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,735,291 B1* | 5/2004 | Schmid et al. | 379/189 |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIllwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 6,988,205 B2* | 1/2006 | Walker et al. | 713/193 |
| 7,010,106 B2* | 3/2006 | Gritzer et al. | 379/202.01 |
| 7,010,109 B2* | 3/2006 | Gritzer et al. | 379/202.01 |
| 7,047,296 B1* | 5/2006 | Safstrom et al. | 709/224 |
| 7,058,163 B1* | 6/2006 | Parekh et al. | 379/85 |
| 7,219,138 B2* | 5/2007 | Straut et al. | 709/219 |
| 7,474,633 B2* | 1/2009 | Halbraich et al. | 370/259 |
| 7,499,530 B2* | 3/2009 | Carroll et al. | 379/88.25 |
| 7,519,836 B2* | 4/2009 | Walker et al. | 713/194 |
| 7,548,539 B2* | 6/2009 | Kouretas et al. | 370/356 |
| 7,660,307 B2* | 2/2010 | Byrd et al. | 370/392 |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0055883 A1 | 3/2003 | Wiles et al. | |
| 2003/0079020 A1 | 4/2003 | Gourraud et al. | |
| 2003/0142805 A1* | 7/2003 | Gritzer et al. | 379/202.01 |
| 2003/0144900 A1 | 7/2003 | Whitmer | |
| 2003/0154240 A1 | 8/2003 | Nygren et al. | |
| 2004/0100507 A1 | 5/2004 | Hayner et al. | |
| 2004/0165717 A1 | 8/2004 | McIlwaine et al. | |
| 2004/0193897 A1 | 9/2004 | Van Volkenburgh | |
| 2005/0138560 A1 | 6/2005 | Lee et al. | |
| 2005/0265554 A1 | 12/2005 | Walker et al. | |
| 2006/0059563 A1 | 3/2006 | Baker | |
| 2006/0089916 A1 | 4/2006 | Shimizu et al. | |
| 2006/0101098 A1 | 5/2006 | Morgan et al. | |
| 2007/0269025 A1* | 11/2007 | Shieh | 379/67.1 |

OTHER PUBLICATIONS

"Customer Spotlight: Navistar International," Web page, unverified print date of Apr. 1, 2002.

"DKSystems Integrates QM Perception with OnTrack for Training," Web page, unverified print date of Apr. 1, 2002, unverified cover date of Jun. 15, 1999.

"OnTrack Online Delivers New Web Functionality," Web page, unverified print date of Apr. 2, 202, unverified cover date of Oct. 5, 1999.

"PriceWaterhouseCoopers Case Study: The Business Challenge," Web page, unverified cover date of 2000.

Abstract, net.working: "An Online Webliography," *Technical Training* pp. 4-5 (Nov./Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of AI in Education," *AMC Crossroads* vol. 1:1-13 (Fall 1996), Web page, unverified print date of Apr. 12, 2002.

Benson and Cheney, "Best Practices in Training Delivery," *Technical Training* pp. 14:17 (Oct. 1996).

Bental and Cawsey, "Personalized and Adaptive Systems for Medical Consumer Applications," *Communications ACM* 45(5):62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosky et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date Apr. 12, 2002, unverified cover date of 1995.

Calvi and De Bra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Apr. 12, 2002, unverified cover date of 2001.

Cole-Gomolski, "New ways to manage E-Classes," *Computerworld* 32(48):4344 (Nov. 30, 1998).

Cross, "Sun Microsystems—the SunTAN Story," Internet Time Group 8 (© 2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Diessel et al., "Individualized Course Generation: A Marriage Between CAL and ICAL," *Computers Educational* 22(1/2)57-64 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*E-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Bridging the Gap in Canada's IT Skills," *Technical Skills and Training* pp. 23-25 (Jul. 1997).
Eline, "Case Study: IBT's Place in the Sun," *Technical Training* pp. 12-17 (Aug./Sep. 1997).
Fritz, "CB templates for productivity: Authoring system templates for trainers," *Emedia Professional* 10(8):6876 (Aug. 1997).
Gibson et al., "A Comparative Analysis of Web-Based Testing and Evaluation Systems," pp. 1-8, Web page, unverified print date of Apr. 11, 2002.
Hallberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Larson, "Enhancing Performance Through Customized Online Learning Support," *Technical Skills and Training* pp. 25-27 (May/Jun. 1997).
Linton et al., "OWL: A Recommender System for Organization-Wide Learning," *Educational Technical Society* 3(1):62-76 (2000).
Lucadamo and Cheney, "Best Practices in Technical Training," *Technical Training* pp. 21-26 (Oct. 1997).
McNamara, "Monitoring Solutions: Quality Must Be Seen and Heard," *Inbound/Outbound* pp. 66-67 (Dec. 1989).
Minton-Eversole, "IBT Training Truths Behind the Hype," *Technical Skills and Training* pp. 15-19 (Jan. 1997).
Mizoguchi, "Intelligent Tutoring Systems: The Current State of the Art," *Trans. IEICE* E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Nelson et al., "The Assessment of *End-User Training Needs*," *Communications ACM* 38(7):27-39 (Jul. 1995).
O'Herron, "CenterForce Technologies' CenterForce Analyzer," Web page, unverified print date of Mar. 20, 2002, unverified cover date of Jun. 1, 1999.
O'Roark, "Basic Skills Get a Boost," *Technical Training* pp. 10-13 (Jul./Aug. 1998).
Pamphlet, "On Evaluating Educational Innovations[1]," authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web product," Web page, unverified print date of Apr. 1, 2002.
Phaup, "QM Perception™ Links with Integrity Training's WBT Manager™ to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.
Piskurich, "Now-You-See-'Em, Now-You-Don't Learning Centers," *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," *Journal of Instructional Development* 7(3):17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Untitled, 10th Mediterranean Electrotechnical Conference vol. I pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to eBusiness".
Witness Systems promotional brochure for eQuality entitled "Building Customer Loyalty Through Business-Driven Recording of Multimedia Interactions in your Contact Center," (2000).

\* cited by examiner

SYSTEMS AND METHODS FOR RECORDING AN ENCRYPTED INTERACTION

TECHNICAL FIELD

This disclosure relates to recording contact center interactions, and more particularly to recording encrypted contact center interactions.

BACKGROUND AND SUMMARY

Call centers have long been used by companies for communicating with their customers on a wide range of topics, including installation, sales, service, cancellation, etc. As ways for communicating with customers have evolved from voice interactions, call centers have been transformed into contact centers which communicate with customers on a variety of media, including electronic mail (e-mail), internet relay chat (IRC), world-wide web, voice over internet protocol (VoIP), text messaging, etc. As these media have evolved, there has been a need for technology to capture these interactions for many purposes, including: recordkeeping, quality, training, etc.

However, the digital nature of this new media can make it more difficult for developing technology to capture these interactions. In particular, encryption technology can inhibit existing recording devices from capturing and/or flagging meaningful information.

A system for recording an encrypted data stream associated with a contact center is provided. The system can include a control protocol switch interface, an encryption key information buffer, a data switch interface and a recording module. The control protocol switch interface provides the system with an interface to a protocol switch, and receives an interaction setup signal from the protocol switch. The interaction setup signal can include an exchange of encryption key information associated with an interaction. The encryption key information buffer can be set up to receive the encryption key information and hold the encryption key information. A data switch interface provides the system with an interface to a data switch, via which the system receives an encrypted data stream associated with the interaction. The encrypted data stream is encrypted such that devices that do not have an encryption key associated with the encrypted data stream are inhibited from reviewing the interaction data. The recording module operates to record the interaction, and the system is operable to decrypt the encrypted data stream using associated encryption key information stored in the encryption key information buffer.

A method for recording encrypted interaction data can include the steps of: receiving an interaction setup signal at a recording device, the interaction setup signal comprising encryption key information associated with interaction data; storing the encryption key information in a key storage, the key storage being configured to store encryption key information for retrieval; receiving encrypted data stream at the recording device, the encrypted data stream representing an encrypted form of interaction data, the encryption being configured to inhibit review of the interaction data without an encryption key; storing the interaction data in a system data store; and, wherein the encrypted interaction data is operable to be decrypted using the stored encryption key information.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
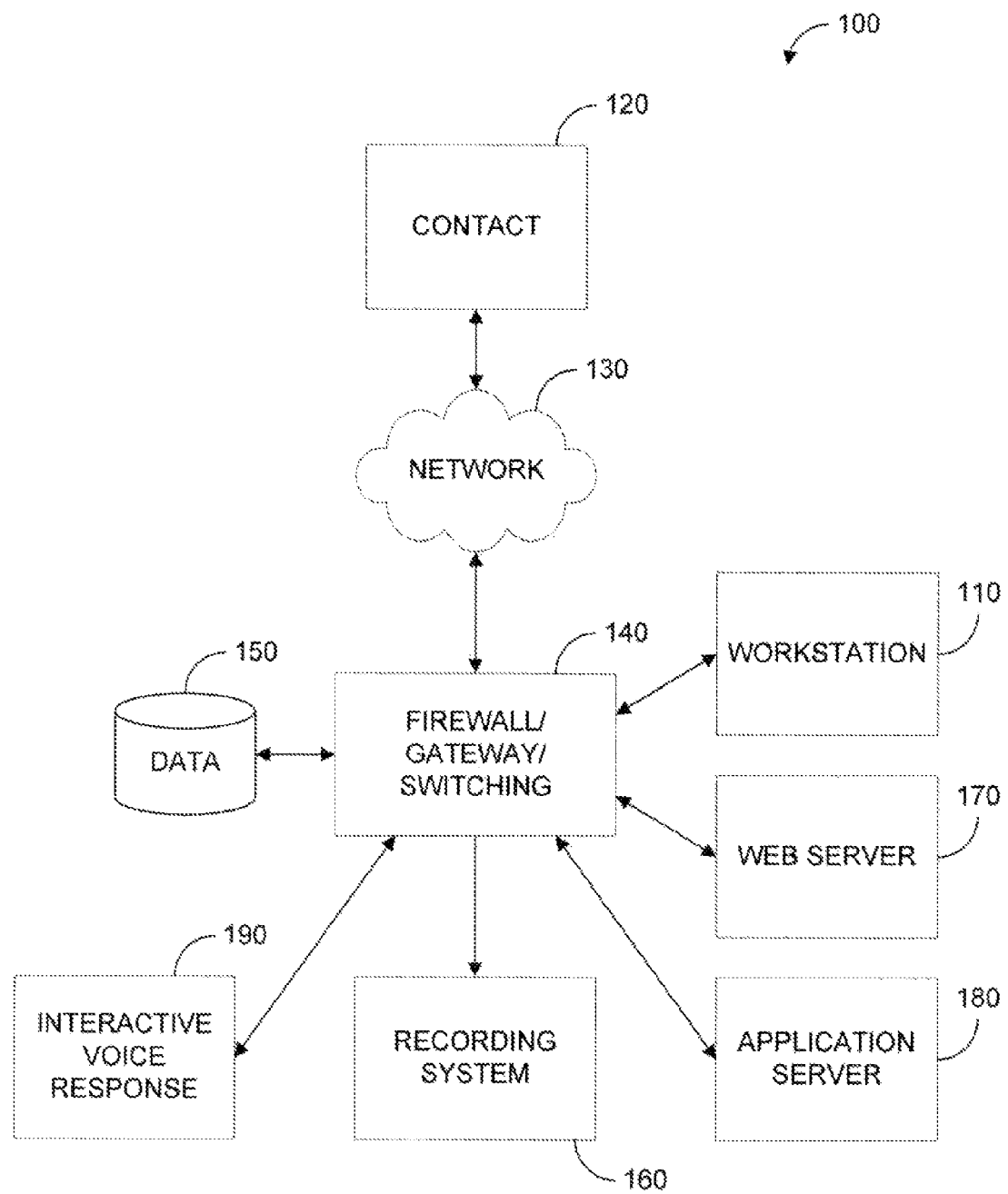
FIG. 1 is a block diagram depicting a generic architecture for a contact center with a recording device.

FIG. 1 shows a block diagram of a contact center architecture. It should be understood that the contact center architecture, in some examples of this disclosure, can include a variety of hardware for interfacing via various media. These may be occasionally referred to as multimedia contact centers. Some media methods for interfacing with a contact center, including for example: voice interaction, a web site, interactive voice response, an application server, instant messaging, chat, short message service (SMS), etc. It should be noted that although many types of media are enabled with respect to the contact center of FIG. 1, that this disclosure is intended to cover a variety of contact center types using any subset of media-types, except where context clearly dictates otherwise.

Voice interaction typically occurs via one or more workstations 110 at which a contact center agents could operate. The workstations 110 facilitate communication between an agent and a contact 120 via an external network 130 and internal network infrastructure 140. It should be understood that the internal network infrastructure used varies based upon the media being supported. For example, an analog telephone call, the hardware can include an automatic call distributor (ACD). More complex voice interaction hardware can include an interface to a public-switched telephone network (PSTN) such as private branch exchange(s), a voice over internet protocol (VoIP) switch(es), a data switch(es), automatic call distributor(s), softphone bank, etc.

It should also be understood that in various examples, the workstation can include a network interface operable to send and retrieve data from a contact center database 150 via the internal network infrastructure 140. The data can include, for example, customer data, account data, service data, preferences, application data, among many others. Such data can be useful in managing and/or routing contact interactions.

Interactions between contact center agents and contacts can be recorded via a recording system 160. The recording system 160 can capture a contact center interaction in any of a number of ways, each of which are known to those-skilled in the art, and are intended to be included within the scope of this disclosure. For example, in some contact centers, a VoIP switch is used to handle control protocol for the network (SIP/SCCP), while a data switch handles the voice traffic (real-time transfer protocol (RTP)). The data switch can be configured to provide a network tap (internet protocol (IP) switch port analyzer (SPAN)). The interaction data is extracted via the network tap and provided to the recording system 160.

Alternatively, the recording device can participate in the call as a silent participant and obtain direct access to the interaction data in real-time. In products available from Avaya Inc. of Basking Ridge, N.J. this type of participation is known as single step conferencing (SSC). However, it should also be understood that other solutions are available for receiving VoIP data, such as, for example, duplicate media streaming (DMS) as described below, and available from Nortel Networks of Brampton, Ontario, Canada, or Cisco Systems, Inc. of San Jose, Calif., among others.

In further alternatives, the recording system 160 can include a soft-phone bank, and thereby controls a plurality of soft-phones which receive emulated IP phone traffic from a VoIP switch or a data switch. It should be understood that the recording system 160 can provide a selective recording system whereby only interactions that satisfy predetermined rules are recorded. The predetermined rules can specify recording of data upon the occurrence of certain events, such as, for example, a specific word being spotted, a voice amplitude outside of a normal threshold being detected, a talk-over condition being detected, etc. Moreover, the predetermined rules can include business rules, which determine when or whether to record based upon any business reasons. It should also be understood that in some examples of this disclosure the recording system can be a bulk recording system, such that all interactions are recorded. Other example recording systems of this disclosure can be both bulk and selective recording systems, such that all interactions are recorded at certain times, while less than all interactions, or pieces of interactions can be recorded at other times.

Web interaction can occur via web server 170. As should be understood, the web server 170 could include connection to a database 150 which includes a number of web pages. The stored web pages in some examples of this disclosure can provide a self-service customer interface. The web server 170 can provide the stored web pages to a contact via one or more data switches and the network 130. In some examples, the web pages are also provided via a gateway and/or firewall.

It should be understood that some or all instances of web interactions may be recorded using the recording system 160. Recording web self-service interactions can be used for example: to help the contact center to improve the web self-service interface, identify problem areas, record transactions, etc. The recording system 160 could be operable to store whole or partial web pages or merely store universal resource locators (URLs) associated with the session. The recorded web pages or URLs are recorded with timing information and machine identification. This information can be used to distinguish among sessions and to rebuild sessions for later replay.

Application server 180 can be used to provide interaction between a contact center and a contact through applications such as a chat application, an instant messaging application, a customer service application, etc. Interactions can be routed between the application server 180 and the contact 120 via a data switch included among the internal network infrastructure 140. Moreover, the application server 180 can interact with a database 150. The database 150 in various examples can provide customer information, account information, application information, etc. to facilitate interaction with the application server.

It should be understood that some or all of these application interactions can be recorded via the recording system 160. The internal network infrastructure 140 in various examples can be configured to provide a network tap, or duplicate media stream to the recording system 160. Alternatively, the recording system 160 could receive a media stream associated with the interaction directly to the application server 180. The recording system 160 in some examples can thereafter determine whether to record the interaction based upon whether the interaction or some other circumstance associated with the interaction satisfies a predefined rule. In yet other examples, the recording system 160 can be configured to record all interactions captured via the internal network infrastructure 140.

An interactive voice response (IVR) server 190 can be configured to provide interactions with contacts via an IVR system 190. As should be understood, an IVR unit provides a voice-based menu type system to a contact, such as a caller. The contact can navigate the interactive voice menu by pressing numbers on a telephone to produce a DTMF tone signal which is sent back to the IVR server 190 via the internal call center network infrastructure 140. The IVR server 190 interprets the DTMF tone and determines the contact's instructions based on the tone. Alternatively, the IVR server 190 may include voice recognition software, such that it can receive voice commands from the contact and interpret the voice commands based on the voice recognition software. The next menu is then played to the contact via the internal network infrastructure and the external network, which can be the PSTN, advanced intelligent network (AIN), or a VoIP network which connects to the customer.

Interactions between the contact and the IVR server 190 can be captured and recorded by a recording system 160. The recording system 160, for example, can use a network tap as described above with a data switch in the internal network infrastructure to capture the interaction. In other examples, the recording system 160 could capture the interaction by receiving a duplicate media stream from a data switch or data device as if the recording system 160 were a party to the conversation. It should also be recognized that in some examples, the recording system 160 could receive a media stream directly from the IVR server 190. Once the recording system 160 receives the interaction, in some examples, it can determine whether to record the interaction based upon whether the interaction or some other circumstance associated with the interaction satisfies a predefined rule. In yet other examples, the recording system 160 can be configured to record all interactions captured via the internal network infrastructure 140.

As is known in the art, encryption can be made available in digital systems to secure the data against misuse by third parties not intended to receive the information encapsulated in the encrypted data. For security, communications can be similarly encrypted. Some contact centers choose to encrypt all data being transmitted via the internal network(s), thereby protecting the data against interception. It should be noted, though, that encrypting network data including any interactions can impose an impediment to the recording system 160. Decrypting encrypted data without an encryption key can be difficult. While cracking an encryption key is possible, the difficulty to cracking a key can become prohibitive to decryption in a contact center environment. For example, recorded interactions may grow at a greater rate than the systems ability to crack the encryption key for each interaction. The recording system 160 of this disclosure interacts with the internal network infrastructure 140 to receive an key for encrypted interactions.

Figure 2:
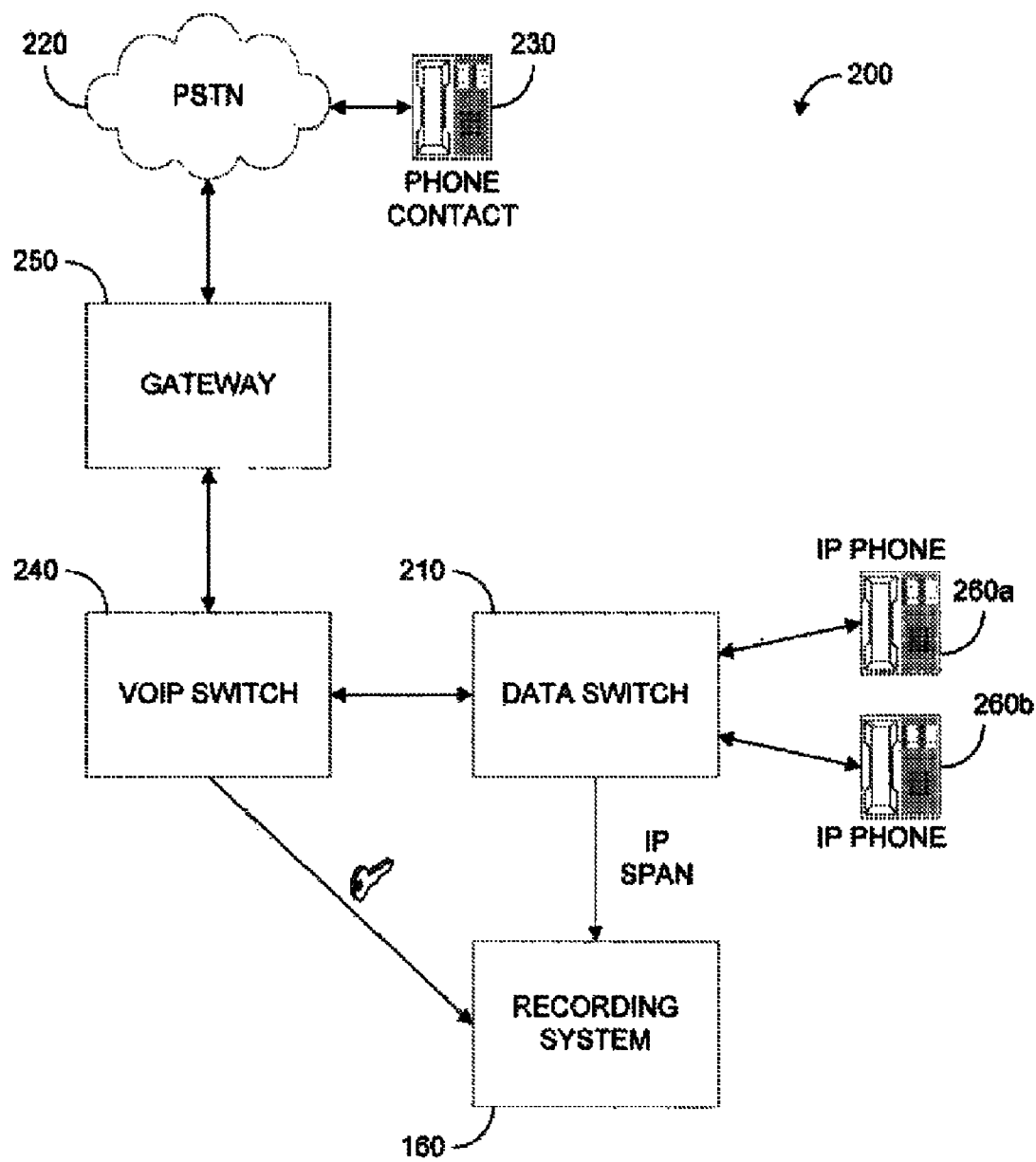
FIG. 2 is a block diagram depicting an example architecture for recording encrypted voice over internet protocol (VoIP) data using an internet protocol span.

An example of an encryption key being provided by the internal network infrastructure is shown with respect to FIG. 2. FIG. 2 generally shows a voice interaction system wherein voice interactions are encrypted within the contact center network and the encrypted interaction data is captured via an IP span between a data switch 210 and a recording system 160. It should be recognized that communications external to the contact center network including the external network such as the PSTN 220 and contact phone 230 may also be encrypted in accordance with this disclosure. Encryption key exchange for these interactions occurs during call setup. A VoIP switch 240 receives the call control protocol (for example: SIP, SCCP, etc.) from the network gateway 250 and determines that the call is to be encrypted. The VoIP switch then distributes encryption key information to the IP phone 260 via a data switch 210 and to the network gateway 250. The VoIP switch 240 also distributes encryption key information to the recording system 160, such that the recording system 160 can decrypt an encrypted voice interaction captured from a data switch 210 in accordance with the present disclosure.

In some examples of this disclosure the encryption key information is distributed to the recorder in an encrypted format so as to protected the encryption key information from interception. Related to the example shown in FIG. 2, the VoIP switch providing the encryption key information encrypts the encryption key information using a public key associated with the recording device 160. The recording system 160 can thereafter decrypt the encryption key information using its private key. It should be understood that the encryption key information can be stored in encrypted format so as to protect both the encryption key information and the encrypted interaction against theft.

In other examples of this disclosure, the encrypted interaction data can be stored in encrypted format such that it is protected against hacking. Such a system could store the encryption key for later decryption of the encrypted interaction data, such as for example, upon a request to retrieve the interaction data for replay to a user. In some examples, the encryption key is stored in volatile memory associated with the recording system 160. In such examples, the encrypted interaction data can be decrypted prior to storing the interaction data to a system data store associated with the recording system 160. In other examples, the encryption key is stored in non-volatile memory until the encrypted interaction data is to be decrypted. The encrypted interaction data can be decrypted upon receiving a retrieval and playback request from a user. Alternatively, the encrypted interaction data can be decrypted during a period of low processor usage.

In an alternative example, the data could be decrypted using the encryption key information received from the VoIP switch 240, and re-encrypted using a different encryption key and/or technique. In some examples, unencrypted interaction data can be encrypted using an encryption engine better suited for long term storage, archival and/or retrieval. It should be recognized that in some embodiments of this disclosure, both the encrypted interaction data and the encryption key information are stored in encrypted format so as to secure the encryption key information and the encrypted interaction data is stored in encrypted format. It should be noted that it is not required by this disclosure that either are encrypted upon storage to disk. However, if the interaction data is unencrypted, the encryption key could be discarded so as to lessen the chances of an intruder cracking the encryption using an old encryption key.

In some examples, the encryption key information comprises an encryption key. In other examples of this disclosure the encryption key information may be a session identification, such that the recording system 160 can request an encryption key associated with the session identification from the VoIP switch 240. It should be understood that in such examples, the VoIP switch 240 could have internal memory enabling it to access a stored encryption key associated with the session identification provided by the recording system 160. In yet further examples the encryption key information could be a key identifier, which could refer to a particular encryption key used by the VoIP switch 240. In this example, the VoIP switch 240 could use an encryption key and associate that key with a key identifier. The VoIP switch 240 could later retrieve the encryption key based upon the key identifier.

Figure 3:
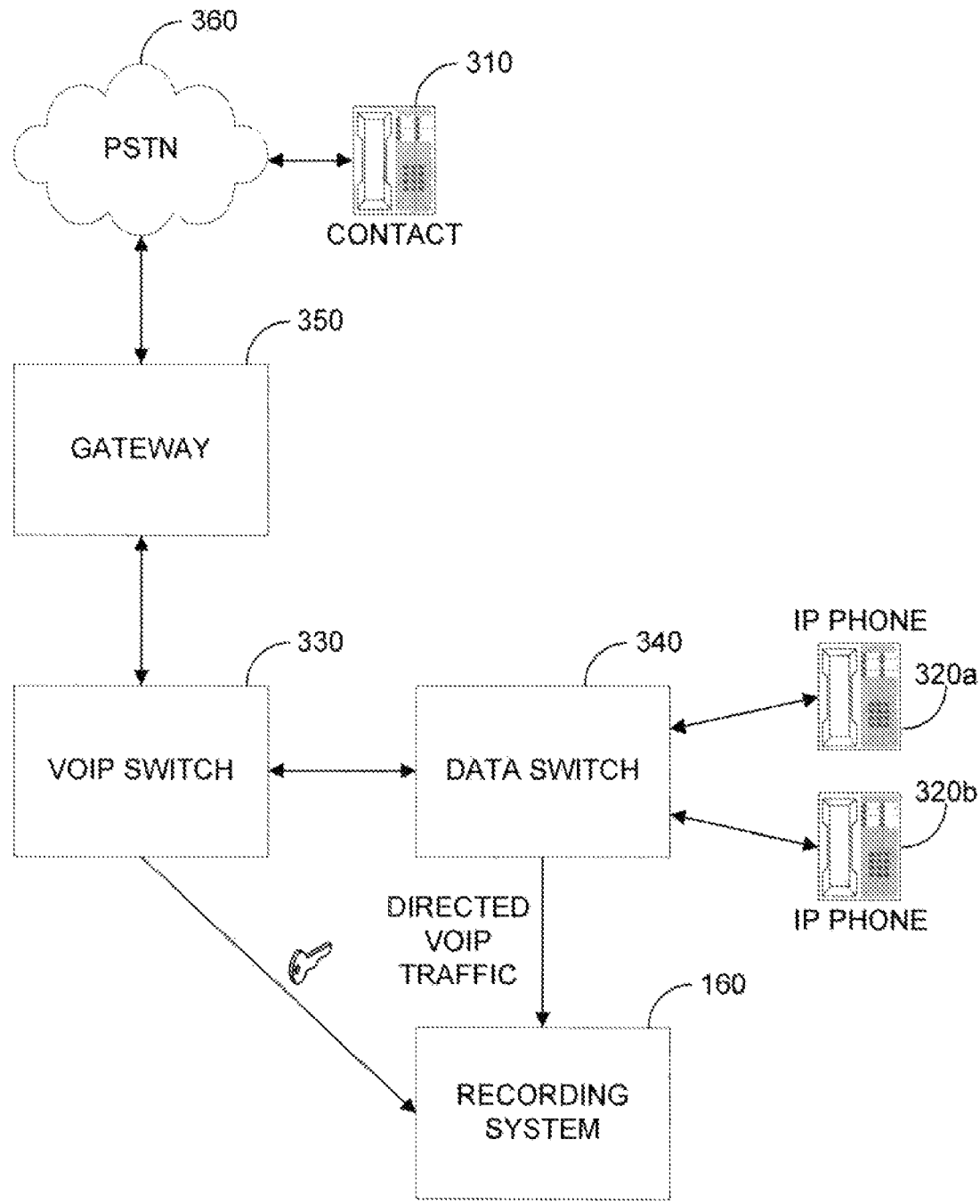
FIG. 3 is a block diagram depicting an example architecture for recording encrypted VoIP data via a directed signal.

FIG. 3 shows another example of a recording system used to record encrypted audio interactions. In this example, the recording system 160 can obtains substantially real-time, direct access to the voice interaction data passing between the contact 310 and the agent via an IP phone 320. It should be understood that such access can occur via SSC or DMS, or any other sort of real-time connection that includes communicating the data streams to the recording system 160 as directed traffic. As a party to the voice interaction, the VoIP switch 330 is configured to send encryption key information for use in decrypting the encrypted interaction data to the recording system 160 during the setup for the voice interaction. Similarly, because the recorder has a recognized connection in the session, the IP Phone may communicate the encryption key to the recorder. The VoIP switch 330 also sends encryption keys to the IP phone 320 and a network gateway 350 for the contact center. The gateway translates the digital VoIP protocol for transmission over the PSTN 360 to the contact 310. It should be understood that in various examples of the present disclosure, the external network could be the Internet or an AIN. A data switch 340 then routes the interaction data to the recording system 160 using a real-time transport protocol (RTP). Alternatively, it should be understood that in various alternative examples interaction data can be communicated using a variety of transport protocols, including, for example, hypertext transfer protocol (HTTP), file transfer protocol (FTP), and internet relay chat (IRC), among many others.

After the call has been setup, the data switch 340 provides the recording system 160 with directed VoIP traffic. Once the recording system 160 receives the encrypted interaction data stream, it can decrypt the encrypted interaction data using the encryption key information received from the VoIP switch 330. In various examples, the encrypted interaction data stream can be decrypted in real-time. In this example, the encryption key information can be stored in volatile or non-volatile memory. Where the encrypted interaction data is decrypted in real time, predefined rules in various embodiments of this disclosure can be applied to the data to determine whether the data should be recorded to a system data store.

The recording system 160 can also be set in some examples up to encrypt any unencrypted data before storing data to the system data store. Interaction data that is re-encrypted can be encrypted using a different key than was used for encrypting the data between the IP phone 320 and the gateway 350. It should also be recognized that the same key that was used to encrypt the data between the IP phone 320 and the gateway 350 could be used for re-encrypting the data. Alternatively, the recording system 160 could use a different encryption algorithm to encrypt the data prior to storing the data in the system data store.

After encrypting the data, the recording system 160 can leave the data encrypted until it is requested to be decrypted.

In some examples, the decryption request can result from a request to replay the data received from a user. In other examples, the encrypted interaction data may be decrypted in order to search the interaction data. Alternatively, the system can extract some data (e.g., contact identification, account number, subject, timestamps, agent identification, etc.) from the interaction and store extracted data in unencrypted format, such that searches can be perforated on the extracted data, thereby providing a rudimentary search of associated encrypted data. Similarly, it could be It should also be recognized that in some examples of the present disclosure, the recording system 160 can store the encryption key information in a key data store. The encrypted interaction data stream can then be stored directly to the system data store. The recording system can thereafter decrypt the data during idle times or times of low processor activity. Alternatively, the interaction data can be stored indefinitely in encrypted format. In such situations, the encryption key information would be stored for decrypting the encrypted interaction data upon direction from the recording system 160. The recording system 160 may be directed to decrypt data upon request from a user for replay of the voice interaction session, or upon a request to search from among the interaction data.

It should also be noted that in some examples of this disclosure the encryption key information includes the encryption key itself. In other examples, the encryption key information includes a session identifier. The session identifier can be transmitted to the VoIP switch 330 subsequent to capturing the data in order to receive a copy of the encryption key from the VoIP switch 330. The VoIP switch of this example would include memory operable to store session identifiers and associate them with encryption keys used by the VoIP switch 330. In yet further examples of this disclosure, the encryption key information can include a key identification. The key identification can be transmitted to the VoIP switch 330 in order to retrieve the encryption key. The VoIP switch 330 would therefore have the ability to associate an identifier with a particular key used by the VoIP switch 330.

In the example where single step conferencing (SSC) is used to communicate directed VoIP traffic to the recording system 160, the recording system 160 and agent IP phone 320a are automatically conferenced in to the voice interaction. Such conferencing typically occurs during call setup. The VoIP switch 330 is configured to send call initiation signals to both the agent IP phone 320a and to the recording system 160. Upon establishing a conference between the contact phone 310, the recording system 160 and the agent IP phone 320a, the VoIP switch 330 can handoff the voice interaction to the data switch 340 for communication of interaction data among the various parties to the voice interaction.

It should be understood that in such examples, the data switch sends directed traffic to the agent IP phone 320a as a party to the voice interaction, and to the recording system 160 as a party to the voice interaction. However, it should also be understood that the recording system 160 typically does not participate in the interaction, but rather receives the voice interaction data and can record the voice interaction data.

The voice interaction can also be encrypted in various examples of single step conferencing. In some examples, the contact center can specify encryption of the voice interaction data. For example, some contact centers may encrypt all data being transmitted on their internal network. Alternatively, encryption of the voice interaction data may be requested, for example, by the contact, by the agent, or by various traits associated with the interaction data itself, among many others. Thus, it should be understood that the decision to encrypt may be made based upon many different factors, and that each of these factors is intended to be included within the present disclosure.

Upon making the determination that the voice interaction traffic is to be encrypted, the VoIP switch 330 is programmed to distribute encryption key information to the parties between which traffic is intended to be encrypted. As should be understood, any number of encryption algorithms can be used to encrypt the information, and each such encryption algorithm is intended to be included within the scope of this disclosure. Encryption key information can enable the parties receiving encryption keys or encryption key information to encrypt and decrypt the voice interaction data received as part of the voice interaction. In some examples, the receipt of an encryption key is an indication to the device receiving the encryption key to encrypt the voice interaction data transmitted by the device, and to decrypt the voice interaction data received at the device using the encryption key. Alternatively, the VoIP switch 330 can affirmatively alert the devices that the voice interaction is to be encrypted.

In the example of SSC described above, a recording system 160 that is conferenced in to the voice interaction can receive the encryption key or an identifier associated with the encryption key and decrypt the data in substantial concurrence with the voice interaction and save the voice interaction to storage. Alternatively, the encryption key (or identifier) and the voice interaction data can be stored to disk, and the encryption key information can be used to decrypt the encrypted voice interaction anytime subsequent to the voice interaction.

It should also be understood that in various examples, the recording system 160 can be programmed selectively record voice interaction data. Such selective recording could enable the recording system to more efficiently utilize storage space as well as bandwidth. As an example of selective recording in accordance with this disclosure, the recording system 160 could be programmed to record the encrypted information on the basis of a schedule. In such an example, the recorder may be programmed to record encrypted voice interactions at certain times of the day, or at peak periods, or on a periodic basis.

Alternatively, the recording system could selectively record data based upon a set of rules. In some examples, the rules may call for recording data where specific events are detected, such as, for example, anger in the voice interaction, specific words being used, or periods of high call volume, among many others. Other examples of rules can include determining whether an encrypted call is to be recorded based upon computer-telephony integration (CTI) information or events, such as identification of the calling party, identification of the agent, a call being put on hold, a call being transferred, a call being conferenced, among many others, each of which is intended to be included within the scope of this disclosure.

In yet further examples, recording of a voice interaction may be triggered by an agent's request to record the voice interaction. In such an example, the agent could send a request to the recording system 160 using a workstation interface to the recording system, via a network. However, it should be understood that there are many systems which could be used to communicate an agent's request to record the voice interaction to the recording system 160, and that each such system is intended to be included within the scope of this disclosure.

In various examples of the present disclosure, the VoIP switch 330 operates functionally as a private branch exchange. It should be noted that the recording system 160, in some instances, such as where the recording system 160 is conferenced, may be late connecting to the voice interaction. This can cause the recording system 160 to be excluded from recording a portion of the voice interaction data occurring before the recording system 160 is able to connect to the voice interaction. In such instances the VoIP switch 330, a private branch exchange, may be programmed to delay the connection to the agent IP phone 320a until the recording system 160 has completed its connection to the voice interaction. As such, the recording system 160 is operable to monitor the entire voice interaction without being excluded from a portion of the voice interaction based upon being belatedly connected to the voice interaction.

In further instances, a delay could also be used to provide the recording system 160 with a period of time in which a selective recording decision may be made. However, it should be recognized that in other examples the recording system 160 could include a buffer, thereby enabling the recording system 160 to temporarily store a discrete amount of data. A recording system 160 with a buffer could make the determination without delaying the voice interaction connection.

Figure 4:
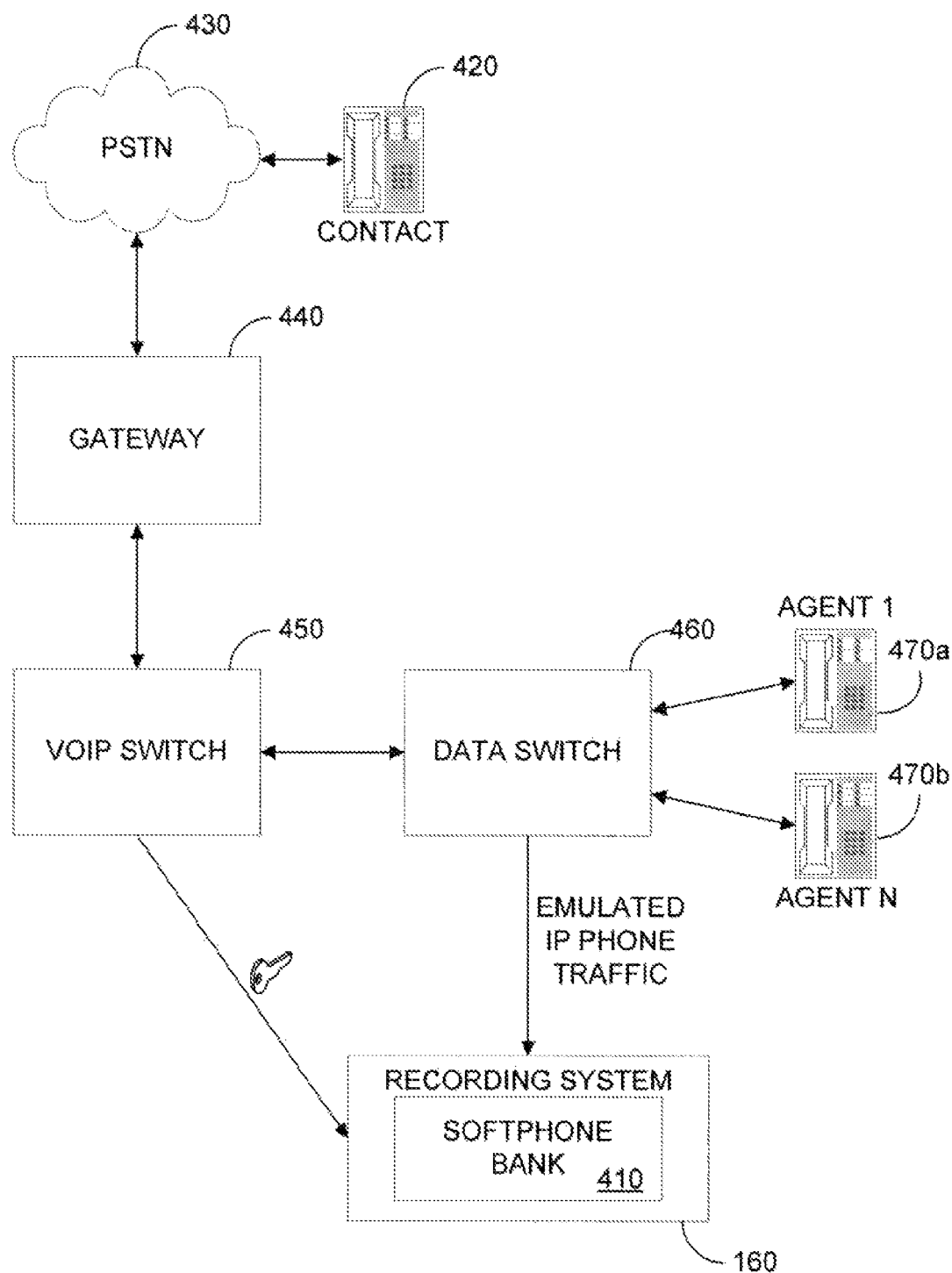
FIG. 4 is a block diagram depicting an example architecture for recording encrypted VoIP data via an emulated internet protocol (IP) phone traffic signal.

FIG. 4 shows a contact center environment for recording encrypted voice interactions using a soft-phone bank 410 co-located with a recording system 160. The contact 420 can contact the contact center via an external network such as a PSTN 430. It should be understood that in alternative examples of this disclosure the external network could be the Internet, an AIN or any other network suitable for transmitting communications between two parties. The contact center can then translate the circuit switched voice interaction received from the PSTN 430 into a packet switch VoIP format using a gateway 440. The VoIP control protocol switching is handled via a VoIP switch 450. The VoIP switch then hands the voice interaction to the data switch 460, which routes the call to the appropriate agent via one or more IP phones 470a, 470b. When the interaction is being encrypted, the VoIP switch 450 is configured to transmit the encryption keys to each of the gateway 440 and the IP phone 470. The VoIP switch 450 in accordance with the present disclosure is also configured to transmit encryption key information to the recording system 160 via soft-phone bank 410.

It should be understood that, where appropriate, the recording system 160 of FIG. 4 can include any of the functionality outlined above with respect to any of the other embodiments of this disclosure as described herein.

Figure 5:
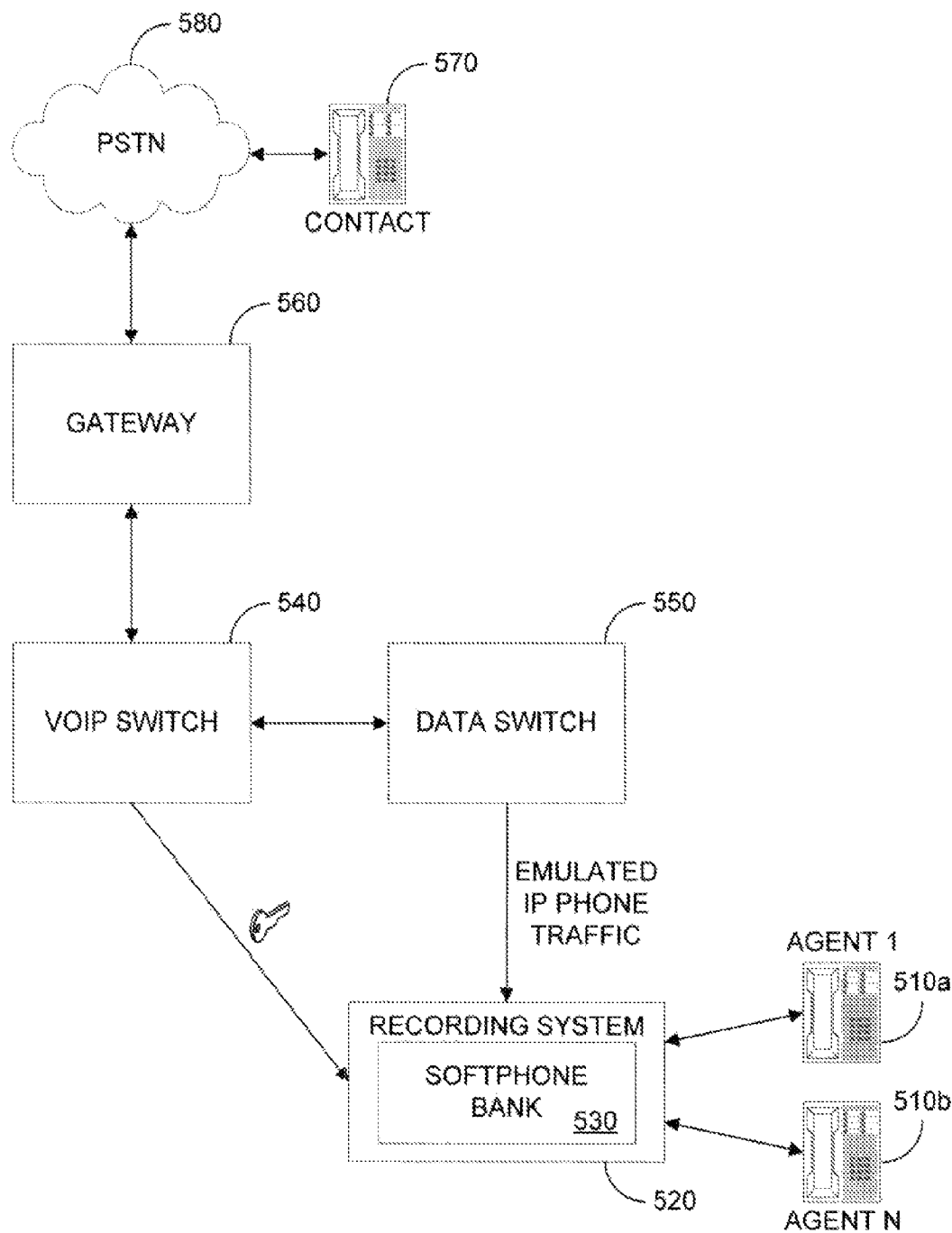
FIG. 5 is a block diagram depicting an example architecture for recording encrypted VoIP data via a softphone bank associated with the recording system.

FIG. 5 depicts an architecture for recording encrypted voice interactions whereby one or more soft-phones interfaces 510a, 510b are connected to the recording system 520 via a soft-phone bank 530. The soft-phone bank 530 is operable to provide an interface through which the calls are routed. Because the soft-phone bank 530 is associated with a recording system, the recording system has access to the data that is traveling to and/or from the soft-phones interfaces 510a, 510b. Thus, the soft-phone bank receives the encryption key from the VoIP switch 540. It should be understood that the softphone bank, for example, could also be invited to record the call by the switch, the recorder/soft-phone bank could receive the information as part of the computer telephony integration (CTI) setup of the call, or the recorder/soft-phone bank could operate to set up the call, among many others. Once the VoIP call has been set up, the soft-phone bank 530 receives the RTP stream from a data switch 550. The data switch handles the RTP stream from a gateway 560, which is operable to translate circuit switch voice interaction data from a contact 570 via an external network, such as for example, the PSTN 580. It should be understood, as noted above, that the external network could be any type of network configured to transport digital or analog, circuit-switch or packet-switched communications.

It should be understood that the recording system 160 of FIG. 5 can include any of the functionality outlined above with respect to any of the other embodiments of this disclosure as described herein.

Figure 6:
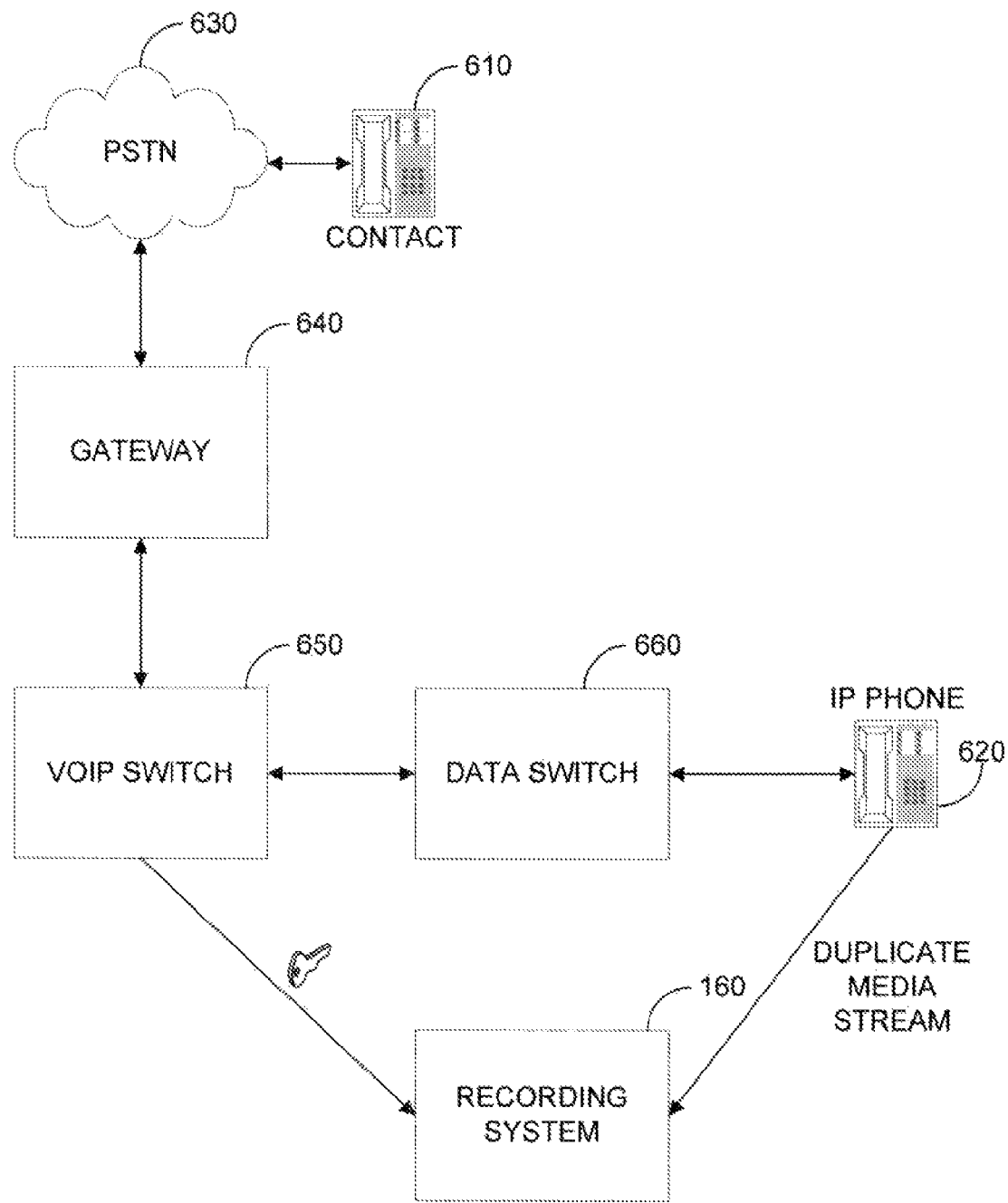
FIG. 6 is a block diagram depicting an example architecture for recording encrypted VoIP data via a duplicate media stream sent to the recording system.

FIG. 6 depicts a recording system 160 configured to record voice interactions between a contact 610 and a contact center agent via IP phone 620 using a duplicate media stream. In this example, the contact 610 calls the contact center via a PSTN 630. It should be understood, however, that the network connecting the contact 610 to the contact center could be any sort of voice or data network operable to carry voice or data signals. In the example where the call is received via the PSTN 630, a gateway 640 receives the call and translates the call such that it can be communicated on the contact center network. A VoIP switch then operates to set up the call with the agent via IP phone 620. The VoIP switch 650 then transfers the call to data switch 660 for handling the data packets traveling between the contact phone 610 and the IP phone 620.

Once the call has been routed to the agent IP phone 620, the agent IP phone 620 starts interacting with the contact via an exchange of media streams with the contact. The VoIP switch 650 first makes a recording call to a bridge on the agent IP phone 620 to request the agent's voice stream. The VoIP switch 660 also makes a recording call to a bridge of the agent's IP phone to request the contact's voice stream. After the connection has been established for each of the agent's voice and contact's voice, the voice streams can be redirected to the recording system 160.

It should be understood that where the interaction is encrypted, the IP phone could supply either decrypted interaction streams to the recorder, or encrypted interaction streams to the recorder. Where the decrypted interaction streams are provided to the recorder, the recorder can store the data directly to disk. Alternatively, the recorder can use an encryption engine to encrypt the data prior to recording the interaction data to disk.

In the example, where the agent IP phone 620 provides encrypted streams to the recorder 160, the VoIP switch 650 can provide the encryption key to the recorder during setup of the recording call for the duplicate media stream between the agent IP phone 620 and the recorder 160. The recorder is thereby enabled to decrypt the data substantially in real-time or anytime thereafter. Moreover, the recorder can be configured to use an encryption engine to encrypt the interaction data substantially in real-time to receiving the data, or anytime thereafter. Furthermore, any of the features described herein with respect to recording systems can be applied with respect to the recording system 160 of FIG. 6.

Figure 7:
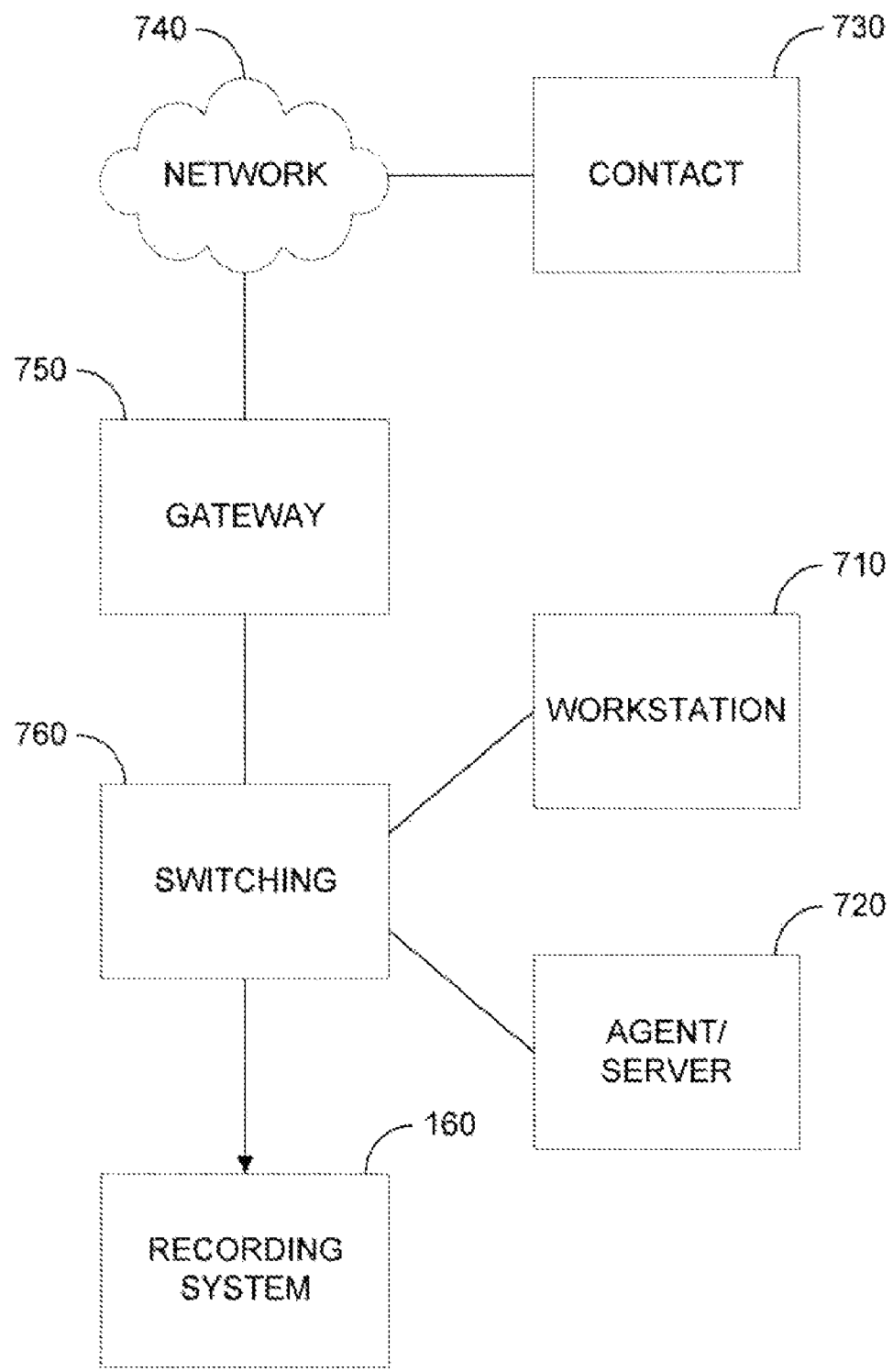
FIG. 7 is a block diagram depicting an example architecture for recording encrypted data at a recording system.

FIG. 7 shows a recording system 160 configured to record encrypted communications passing between a contact center workstation 710 or server 720 and a contact 730 via an external network 740. The external network 740 can be connected to the internal contact center network via a gateway 750, which is used to translate external protocol to internal protocol for incoming traffic, and internal protocol to external protocol for outgoing traffic. However, it should be understood that a gateway is not necessary where the internal and external networks are operating using the same protocol.

The interaction is controlled via switching 760. Switching 760 can provide control protocol for setup and teardown of the communication path. Switching 760 can also provide for key exchange between the contact 730 and the workstation 710 or server 720 in case of an encrypted interaction session. The switching 760 in the event of encrypted interactions can also provide encryption key information to the recording system 160. As described above the encryption key information can include the encryption key itself or can include another mechanism through which the encryption key can be later derived. Alternatively, it should be noted that the switching 760 in some examples may contain a decryption engine. The decryption engine can enable the switching 760 to perform decryption of the interaction when the decryption engine is provided with the encrypted interaction stream by the recording system 160. As such, the encryption key remains secret, and the recording system is able to store the interaction data. Moreover, if security of the interaction is a concern, the switching can re-encrypt the decrypted interaction data using a public key received from the recording system 160. The re-encrypted interaction data can then be securely transmitted to the recording system 160, where it can be decrypted using a private key known only to the recording system 160.

It should be understood that the block diagram of FIG. 7 can be used to record a variety of types of encrypted interaction data, including, among many others: chat data, screen data, application data, instant messaging data, web self-service data, etc. Further, any of the features described herein with respect to recording systems can be applied with respect to the recording system 160 of FIG. 7

Figure 8:
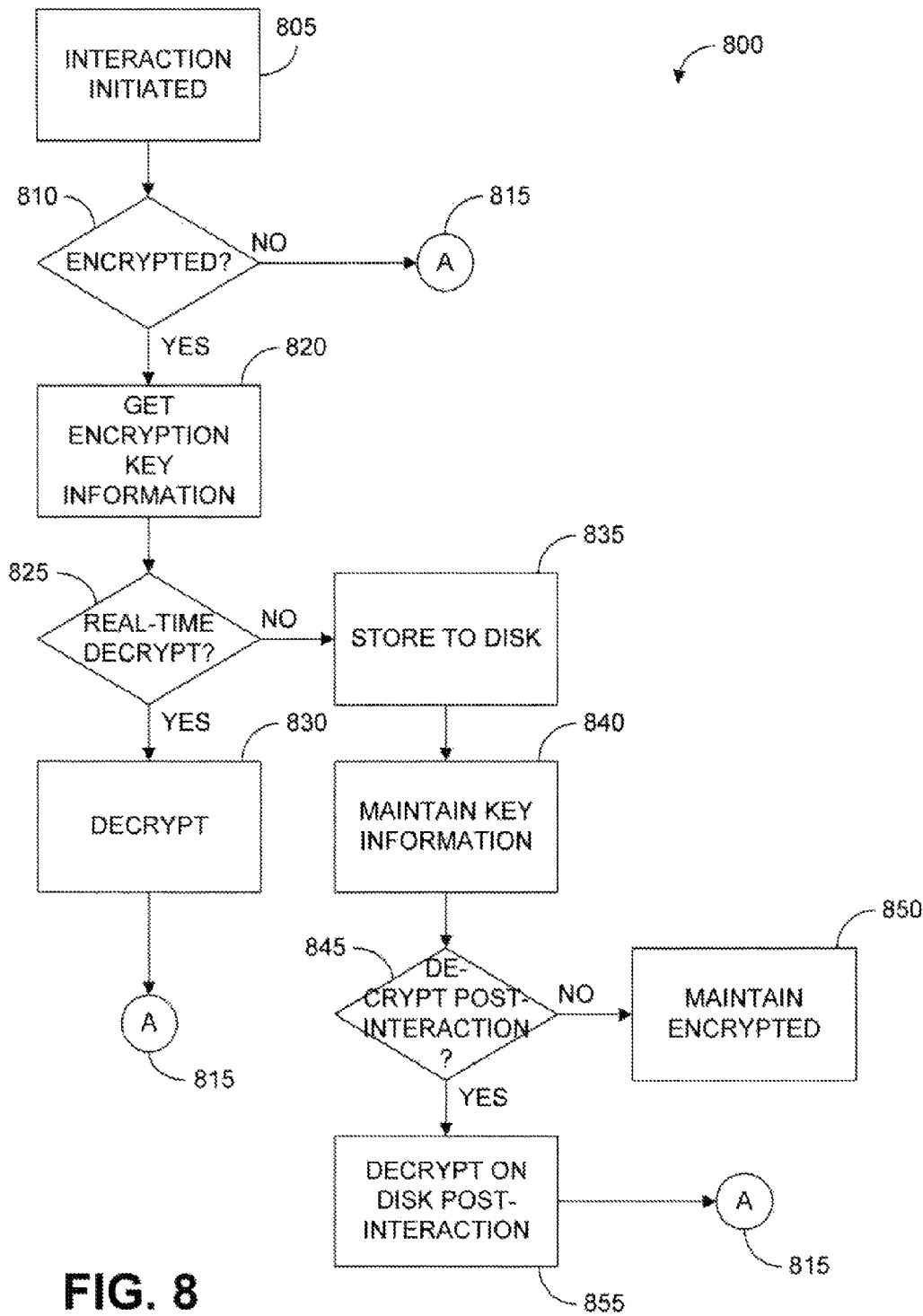
FIG. 8 is a flowchart illustrating an operational scenario for recording encrypted data.

An example operational scenario 800 depicting a process for a recording system of the present disclosure is depicted in FIG. 8. The recording process begins at step 805, whereby the operational scenario determines that a interaction has been initiated. Upon initiation of the interaction, the operational scenario 800 determines whether the interaction is an encrypted interaction in step 810. If the interaction is not encrypted, the operational scenario 800 proceeds to a storage process as noted by block 815.

If the interaction is determined to have been encrypted, the operational scenario 800 continues to step 820, wherein the encryption key information is obtained. After obtaining the encryption key information, the operational scenario 800 determines whether real-time decryption is to be performed on the encrypted interaction data. This determination can be made, for example, among many others: by default, according to system setup, based on available system resources, or any reason that could affect system performance. As should be understood, the encrypted interaction data is being captured in parallel with operational scenario 800. Where the encrypted interaction data is supposed to be decrypted in real-time, the operational scenario 800 uses the obtained encryption key information to decrypt the encrypted interaction data, as shown in step 830. The operational scenario 800 then proceeds to a storage process as noted by block 815.

Returning to decision block 825, if it is determined that the data is not to be decrypted in real-time, the operational scenario 800 stores the encrypted interaction data to disk in the encrypted format in which the interaction data was received, as depicted by step 835. Further, the operational scenario 800 could maintain the encryption key information in accordance with step 840. The encrypted key information could be stored in encrypted format or unencrypted format, in accordance with this disclosure. At step 845, the operational scenario determines whether the interaction should be decrypted on disk after the interaction is complete. In such circumstances, the operational scenario may wait and decrypt the encrypted interaction when the system resources are at low usage, thereby enabling a contact center to achieve similar results with lower system requirements. If the data is not to be decrypted post-interaction, the system maintains the interaction in encrypted format indefinitely, as shown in step 850.

If the data is to be decrypted post-interaction, the operational scenario 800 decrypts the encrypted interaction data and stores the decrypted interaction on to a system data store after the interaction is complete, as shown by step 855. The operational scenario 800 then proceeds to a storage process as noted by block 815.

Figure 9:
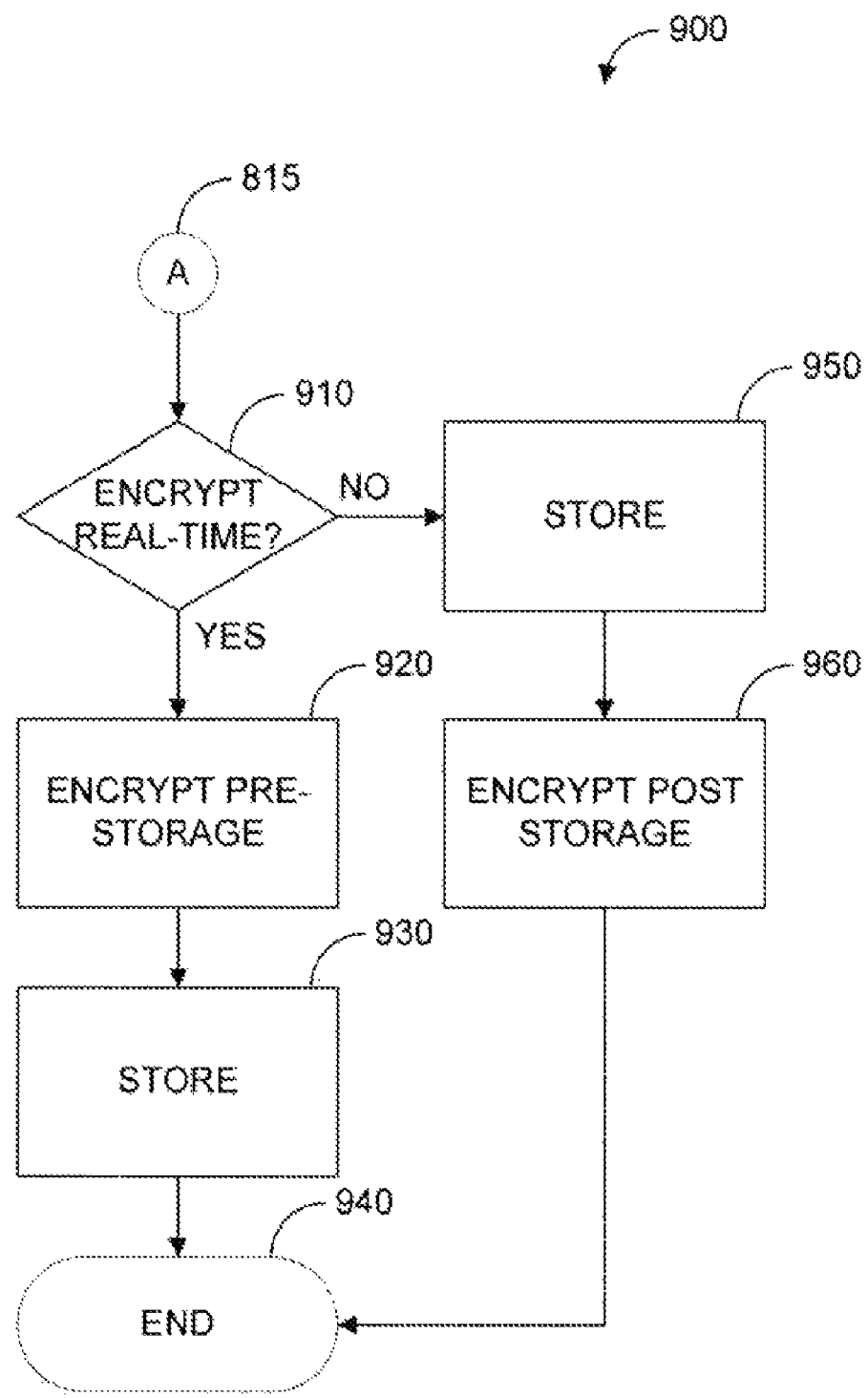
FIG. 9 is a flowchart, illustrating art operational scenario for encrypting recorded data for security.

An example of a storage process as implicated by step 815 of FIG. 8 is shown in FIG. 9. The storage process of FIG. 9 begins at step 910, whereby operational scenario 900 determines whether the recording system should encrypt the interaction data in real-time prior to storing the unencrypted interaction data to a system data store. If the data is to be encrypted prior to storage to disk, the operational scenario 900 proceeds to step 920, whereby the unencrypted interaction data is encrypted prior to storage to a system data store. The operational scenario 900 then stores the encrypted interaction data to the system data store as shown by step 930. The operational scenario 900 then terminates at block 940.

If the operational scenario determines that the unencrypted interaction data is not to be encrypted prior to storage to a system data store, the operational scenario proceed to step 950, where the unencrypted interaction data is stored to a system data store. The data can subsequently be encrypted, as shown by step 960. The operational scenario then terminates at block 940.

A number of embodiments of this disclosure have been described. Nevertheless, it will be understood that various modifications may be made without departing from the scope of the disclosure. For example, some systems may include the ability to discriminate between encrypted and unencrypted data, others may include keeping the interaction data encrypted for security, while yet others may include abstracting upon the encryption key and/or cooperating with a switch to decrypt the encrypted interaction. Accordingly, many embodiments are within the scope of the following claims.

What is claimed is:

1. A system for recording an encrypted data stream, the encrypted data comprising a contact center interaction, the system comprising:
   a control protocol switch interface configured to interface with a protocol switch and receive an interaction setup signal, the interaction setup signal including an exchange of encryption key information associated with an interaction;
   an encryption key information buffer coupled to the control protocol switch interface, the encryption key information buffer being configured to receive the encryption key information and hold the encryption key information;
   a data switch interface configured to interface with a data switch and receive an encrypted data stream associated with the interaction, the encrypted data stream being encrypted such that devices that do not have an encryption key associated with the encrypted data stream are inhibited from reviewing the interaction data; and
   a recording module configured to record the interaction;
   wherein the system is operable to subsequently decrypt the encrypted data stream using associated encryption key information held in the encryption key information buffer,
   wherein the system is not a party to the interaction, and
   wherein the recording module receives a duplicate media stream representing the interaction, and the encryption key information is received from the source of the duplicate media stream.

2. The system of claim 1, wherein the system is a party to the interaction.

3. The system of claim 1, wherein the encryption key information is provided via an external interface.

4. The system of claim 1, wherein the system negotiates to receive the encryption key information during setup of the interaction.

5. The system of claim 1, further comprising a soft-phone bank operable to receive interactions and communicate the interactions to the recording module.

6. The system of claim 1, wherein the encrypted data stream is decrypted at runtime before the recording logic records the interaction.

7. The system of claim 1, wherein the control protocol switch interface is further configured to determine whether an interaction is encrypted or unencrypted based upon the setup signal received from the control protocol switch, wherein the data switch is configured to capture the unencrypted interaction and the recording module is configured to record the unencrypted interaction.

8. The system of claim 7, further comprising an encryption module configured to generate a key and to encrypt the unencrypted interaction using the generated key.

9. The system of claim 8, further comprising a storage module configured to store the recorded interaction to a non-volatile data store, wherein the encryption module encrypts the unencrypted interaction prior to the information being stored to the non-volatile data store.

10. The system of claim 1, wherein the recording logic is operable to record the encrypted data stream comprising the interaction to a non-volatile data store, the system further comprising:
an encryption key information data store configured retrieve the encryption key information from the encryption key information buffer and to store the encryption key information in non-volatile storage;
decryption engine configured to retrieve the encryption key information from the encryption key information data store and to decrypt the encrypted data stream after it has been recorded to the non-volatile data store.

11. The system of claim 10, wherein the decryption engine uses idle processor cycles to decrypt the encrypted data stream.

12. The system of claim 10, wherein the encryption key information comprises an encryption key and the encryption key is securely passed between the encryption key information buffer and the decryption engine.

13. The system of claim 10, wherein the encryption key is encrypted prior to storage in the encryption key information data store.

14. The system of claim 1, further comprising an encryption engine configured re-encrypt the interaction data after the interaction data has been decrypted.

15. The system of claim 14, wherein the encryption engine is further configured to encrypt any unencrypted data stream prior to the interaction data being written to a non-volatile data store.

16. The system of claim 14, wherein the encryption engine is further configured to encrypt any unencrypted interaction data after the interaction data has been written to a non-volatile data store, the encryption engine using idle processor time to encrypt the unencrypted interaction data.

17. A system for recording an encrypted data stream, the encrypted data comprising a contact center interaction, the system comprising:
a control protocol switch interface configured to interface with a protocol switch and receive an interaction setup signal, the interaction setup signal including an exchange of encryption key information associated with an interaction;
an encryption key information buffer coupled to the control protocol switch interface, the encryption key information buffer being configured to receive the encryption key information and hold the encryption key information;
a data switch interface configured to interface with a data switch and receive an encrypted data stream associated with the interaction, the encrypted data stream being encrypted such that devices that do not have an encryption key associated with the encrypted data stream are inhibited from reviewing the interaction data; and
a recording module configured to record the interaction;
wherein the system is operable to subsequently decrypt the encrypted data stream using associated encryption key information held in the encryption key information buffer,
wherein the encryption key information is obtained via a control protocol interface between the system and the control protocol switch, and
wherein the encryption key information used to decrypt the control protocol is requested from the control protocol switch based upon an endpoint or call identification, and is provided during the interaction or after the interaction is complete.

18. The system of claim 17, wherein the control protocol is unencrypted.

19. The system of claim 17, wherein the control protocol is encrypted.

20. A system for recording an encrypted data stream, the encrypted data comprising a contact center interaction, the system comprising:
a control protocol switch interface configured to interface with a protocol switch and receive an interaction setup signal, the interaction setup signal including an exchange of encryption key information associated with an interaction;
an encryption key information buffer coupled to the control protocol switch interface, the encryption key information buffer being configured to receive the encryption key information and hold the encryption key information;
a data switch interface configured to interface with a data switch and receive an encrypted data stream associated with the interaction, the encrypted data stream being encrypted such that devices that do not have an encryption key associated with the encrypted data stream are inhibited from reviewing the interaction data;
a recording module configured to record the interaction; and
an encryption module configured to generate a new key separately from the encryption key information used to encrypt the interaction, the encryption module being further configured to re-encrypt the decrypted interaction data using the new key,
wherein the system is operable to subsequently decrypt the encrypted data stream using associated encryption key information held in the encryption key information buffer, and
wherein the recording module comprises a decryption buffer and is configured to decrypt the encrypted data stream in volatile storage prior to storage to a data store using the decryption buffer.

21. A method for recording encrypted interaction data, the method comprising the steps of:

receiving an interaction setup signal at a recording device, the interaction setup signal comprising encryption key information associated with interaction data;

storing the encryption key information in a key storage, the key storage being configured to store encryption key information for retrieval;

receiving encrypted data stream at the recording device, the encrypted data stream representing an encrypted form of interaction data, the encryption being configured to inhibit review of the interaction data without an encryption key; and storing the interaction data in a system data store, wherein the encrypted interaction data is operable to be decrypted using the stored encryption key information, wherein the recording device is not a party to the interaction, and wherein the data switch interface receives a duplicate media stream representing the interaction, and the encryption key information is received from the source of the duplicate media stream.

22. The method of claim 21, wherein the recording device is a party to the interaction.

23. The method of claim 22, further comprising the step of decrypting the encrypted data stream at runtime prior to storing the interaction data to the system data store.

24. The method of claim 22, further comprising the steps of:

determining whether the interaction is encrypted or unencrypted based upon the interaction setup signal; and capturing any unencrypted data stream associated with the interaction.

25. The method of claim 24, further comprising:
generating an encryption key; and
encrypting the unencrypted interaction using the generated key.

26. The method of claim 25, further comprising:
storing the recorded interaction to a non-volatile data store; and
encrypting the unencrypted interaction prior to the information being stored to the non-volatile data store.

27. The method of claim 21, wherein the encryption key information is provided via an external interface.

28. The method of claim 21, wherein the recording device negotiates to receive the encryption key information during setup of the interaction.

29. The method of claim 21, further comprising:
recording the encrypted data stream comprising the interaction data directly to a non-volatile interaction data store;
storing the encryption key information in a non-volatile encryption key information data store;
retrieving the encryption key information from the non-volatile encryption key information data store; and
decrypting the encrypted data stream after it has been recorded to the non-volatile interaction data store.

30. The method of claim 29, further comprising:
detecting when a processor associated with the recording device is experiencing idle time; and
using the processor's idle time to decrypt the encrypted data stream using a decryption engine executed by the recording device.

31. The method of claim 29, wherein the encryption key information comprises an encryption key, the method further comprising the step of securely passing the encryption key information between non-volatile encryption key information data store and the decryption engine.

32. The method of claim 29, wherein the encryption key information is encrypted prior to storage in the non-volatile encryption key information data store.

33. The method of claim 21, further comprising independently re-encrypting the interaction data after the interaction data has been decrypted using an encryption engine.

34. The method of claim 33, further comprising encrypting any unencrypted data stream prior to the interaction data being written to a non-volatile data store.

35. The method of claim 33, further comprising detecting a period of low processor usage at the recording device; using the period of low processor usage to encrypt any unencrypted interaction data stored on a non-volatile data store.

36. The method of claim 21, wherein the interaction data is stored without decrypting the data, thereby storing encrypted data stream.

37. The method of claim 36, wherein the interaction data is decrypted using the stored encryption key information associated with the encrypted data stream during a period of time when a computer processor associated with the receiving and storing steps is in a period of low usage.

38. The method of claim 36, wherein the interaction data is decrypted using the stored encryption key information associated with the encrypted data stream upon receiving a request from a playback module.

39. A method for recording encrypted interaction data, the method comprising the steps of:

receiving an interaction setup signal at a recording device, the interaction setup signal comprising encryption key information associated with interaction data;

storing the encryption key information in a key storage, the key storage being configured to store encryption key information for retrieval;

receiving encrypted data stream at the recording device, the encrypted data stream representing an encrypted form of interaction data, the encryption being configured to inhibit review of the interaction data without an encryption key; and storing the interaction data in a system data store, wherein the encrypted interaction data is operable to be decrypted using the stored encryption key information, wherein the encryption key information is obtained via a control protocol sent between the recording device and a control protocol switch, and wherein the encryption key information used to decrypt the control protocol is requested from the control protocol switch based upon an endpoint or call identification, and is provided during the interaction or after the interaction is complete.

40. The method of claim 39, wherein the control protocol is unencrypted.

41. The method of claim 39, wherein the control protocol is encrypted.

42. The method of claim 39, further comprising providing a soft-phone bank at the recording device, the softphone bank being operable to receive interactions and route the interactions to a contact center agent.

43. A method for recording encrypted interaction data, the method comprising the steps of:

receiving an interaction setup signal at a recording device, the interaction setup signal comprising encryption key information associated with interaction data;

storing the encryption key information in a key storage, the key storage being configured to store encryption key information for retrieval;

receiving encrypted data stream at the recording device, the encrypted data stream representing an encrypted form of interaction data, the encryption being configured to inhibit review of the interaction data without an encryption key;

storing the encrypted data in memory prior to storage to a data store using a decryption buffer;

storing the interaction data in a system data store; and generating a new encryption key, and re-encrypting the decrypted interaction data using the new encryption key, wherein the encrypted interaction data is operable to be decrypted using the stored encryption key information.

* * * * *